S. OBOLEWICZ.
FLAGSTAFF HOLDER.
APPLICATION FILED JUNE 16, 1919.
1,317,590.
Patented Sept. 30, 1919.
FIG. 1.
FIG. 2.
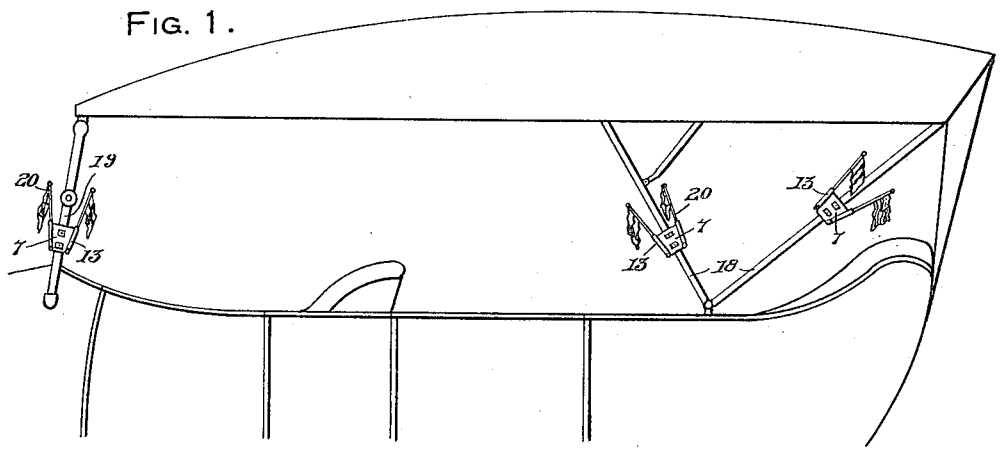
FIG. 3.
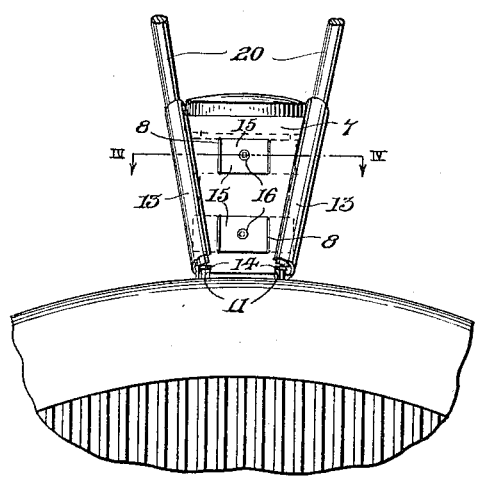
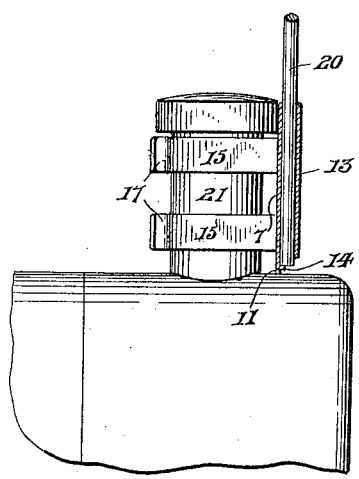
FIG. 4.
FIG. 5.
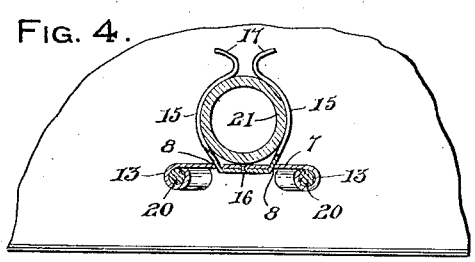
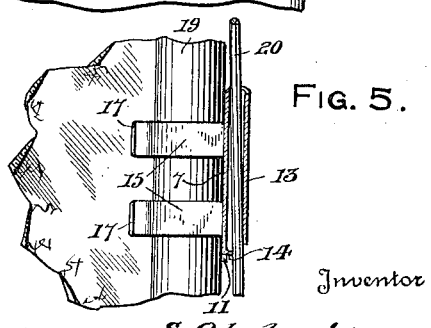
FIG. 6.
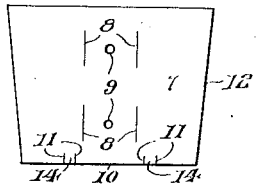
Inventor
S. Obolewicz
By N. M. Wilson
Attorney

UNITED STATES PATENT OFFICE.

STANISLAW OBOLEWICZ, OF DETROIT, MICHIGAN, ASSIGNOR TO JOSEPH NIGBOR, OF DETROIT, MICHIGAN.

FLAGSTAFF-HOLDER.

1,317,590.      Specification of Letters Patent.    Patented Sept. 30, 1919.

Application filed June 16, 1919. Serial No. 304,538.

*To all whom it may concern:*

Be it known that I, STANISLAW OBOLEWICZ, a citizen of Poland, residing at Detroit, in the county of Wayne and State of Michigan, have invented certain new and useful Improvements in Flagstaff-Holders, of which the following is a specification.

The primary object of the present invention is to provide a flag staff holder formed of a blank of sheet metal bent to provide staff receiving sockets with means carried by the plate and coöperating with said sockets to form a support for the lower end of the flag staff or to provide means for resiliently engaging the side of the flag staff at a desired point spaced from its ends whereby the flag staff is rigidly and adjustably mounted in the socket therefor.

A further object of the invention is to provide a flag staff holder that is capable of being mounted upon the top bows of an automobile or upon the radiator spout, or in fact upon any support desirable by resilient arms while the flag staff holding members are formed by bending the plate at opposite side edges thereof and further notching and bending the plate to provide flag staff engaging elements.

With the above and other objects in view, the invention consists in the novel combination and arrangement of parts herein fully described in connection with the accompanying drawing, and in which like reference characters indicate similar parts throughout the several views.

In the drawing:

Figure 1 is a side elevational view of an automobile top with a portion of the automobile body and with the present invention in display position thereon, Fig. 2 is a front elevational view of the staff holder in operative position upon an automobile radiator spout, Fig. 3 is a side elevational view of the construction shown in Fig. 2 with one of the flag staff holders shown in section to illustrate the spring finger support for the lower end of the flag staff, Fig. 4 is a horizontal sectional view taken on line IV—IV of Fig. 2, illustrating a method of connecting the spring mounting arms to the flag staff plate, Fig. 5 is a detail view of a portion of the flag staff holder shown attached to the side rail of a wind shield with the staff holder shown in section and with the lower end thereof projecting outwardly of the socket and engaged by the spring finger intermediate the ends thereof.

Fig. 6 is a developed plan view of the blank from which the holder is constructed.

The detailed construction of the invention is shown more clearly in Figs. 4 and 6, there being provided a metal blank 7 preferably of the form shown having upper and lower vertically extending pairs of spaced slots 8 formed therein and between which rivet receiving openings 9 are formed, the lower edge 10 of the blank 7 being provided with relatively small spaced slits 11.

In forming the flag staff holder, the side edges 12 of the blank 7 are folded inwardly upon the body portion of the blank to circular formation as shown in Fig. 2 to provide flag staff receiving sockets 13 while the finger portions 14 between the lower edge slits 11 are bent at right angles to the blank 7 to underlie the open lower end of the sockets 13 as clearly illustrated in Figs. 3 and 5.

Spring arms 15 are carried by the blank 7 and by which the blank is secured to any desirable support, the spring arms 15 being passed through the slots 8 in the blank while rivets 16 extend through the intermediate portions of the arms and openings 9 in said blank for securing the arms in proper position, it being noted, however, that applicant may employ any other method desired for securing the attaching arms to the blank. The free ends of the spring arms 15 are curved outwardly as at 17 to permit an easy application of the same upon a support.

In the use of the device, and as shown in Fig. 1, the spring arms 15 resiliently engage the top bows 18 of an automobile and also the wind shield frame 19, the spring arms holding the blank 7 in fixed position upon the bows and wind shield frame while the flag staffs 20 are received in the sockets 13 with the lower ends thereof engaged by the spring fingers 14. The device may also be attached to the filling spout 21 of an automobile radiator as shown in Figs. 2, 3, and 4 and upon this application, the flag staffs 20 are supported by the spring fingers 14.

If desired, should the flag staff be too long as in use upon the top bows or the wind shield frame, the flag staff 20 may be moved downwardly beyond the spring fingers 14 as shown in Fig. 5 so that the forward edge of the spring finger will bite into the side of the flag staff 20 and hold the same in any adjusted position so that the height of the flag may be readily controlled and be securely retained in position in the staff holder, it being unnecessary to adjust the spring arms 15 upon the support and when necessary to move the flag staff from the sockets 13 to provide a proper clearance for the flags relative to the automobile top.

While I have shown and described what are believed to be the preferred embodiments of my invention, it is nevertheless to be understood that minor changes may be made in the form, combination and arrangements of parts without departing from the spirit and scope of my invention as claimed.

What I claim as new is:—

1. A flag staff holder formed of a blank having spaced slots therein and spaced slits at the lower end thereof, flag staff receiving sockets formed at the opposite side edges of said blank by folding the blank inwardly, the portions of the lower edge of the blank between said slits being bent to underlie said sockets and provide resilient tongues and capable of supporting a flag staff by engaging the lower end thereof and also by engaging the flag staff intermediate the ends, and attaching means associated with said slots.

2. A flag staff holder comprising a metal blank, spring arms secured thereto, staff receiving sockets formed at the opposite side edges of the blank, spring fingers carried by the lower edge of the blank underlying said sockets and adapted for engagement with the flag staff at its end and at points intermediate the ends thereof.

In testimony whereof I affix my signature.

STANISLAW OBOLEWICZ.

Copies of this patent may be obtained for five cents each, by addressing the "Commissioner of Patents, Washington, D. C."